US012723457B2

(12) United States Patent
Hors et al.

(10) Patent No.: US 12,723,457 B2
(45) Date of Patent: Sep. 1, 2026

(54) SYSTEM FOR CONTROLLING THE SPEED OF MOVEMENT OF A SLIDING DOOR AND ASSOCIATED AIRCRAFT

(71) Applicant: SAFRAN ELECTRONICS & DEFENSE, Paris (FR)

(72) Inventors: Daniel Hors, Moissy-Cramayel (FR); Aurélien Bellier, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 155 days.

(21) Appl. No.: 18/726,785

(22) PCT Filed: Jan. 10, 2023

(86) PCT No.: PCT/FR2023/050034

§ 371 (c)(1),
(2) Date: Jul. 3, 2024

(87) PCT Pub. No.: WO2023/135388

PCT Pub. Date: Jul. 20, 2023

(65) Prior Publication Data

US 2025/0067111 A1 Feb. 27, 2025

(30) Foreign Application Priority Data

Jan. 12, 2022 (FR) ....................................... 2200233

(51) Int. Cl.

*B60R 22/00* (2006.01)
*E05F 5/00* (2017.01)
*E05F 15/659* (2015.01)

(52) U.S. Cl.

CPC ............ *E05F 15/659* (2015.01); *E05F 5/003* (2013.01); *E05Y 2201/258* (2013.01); *E05Y 2400/36* (2013.01); *E05Y 2900/502* (2013.01)

(58) Field of Classification Search

CPC .. E05F 15/659; E05F 5/003; E05Y 2201/258; E05Y 2400/36; E05Y 2900/502

See application file for complete search history.

(56) References Cited

U.S. PATENT DOCUMENTS

2012/0222267 A1* 9/2012 Desrosiers .............. E05F 5/003 16/82
2019/0119966 A1 4/2019 Barbieri

FOREIGN PATENT DOCUMENTS

EP 3747760 A1 12/2020
WO 2022002646 A1 1/2022

OTHER PUBLICATIONS

International Application No. PCT/FR2023/050034, International Search Report and Written Opinion, Apr. 13, 2023, 13 pages (2 pages of English translation and 11 pages of original document).

* cited by examiner

*Primary Examiner* — Adam M Alharbi

(74) *Attorney, Agent, or Firm* — Kilpatrick Townsend & Stockton LLP

(57) ABSTRACT

The system for controlling the speed of movement of a sliding door for an aircraft comprises a means for electromagnetically braking the door including a transmission shaft and electromagnetic resistive means. The resistive means are autonomous and include a control law relating a first damping value to a first speed threshold of the speed of movement of the door, a second damping value to a second speed threshold of the speed of movement of the door, the resistive means applying on the transmission shaft the resistive torque equal to a first torque proportional to the first damping value when the speed of movement is higher than the first speed threshold, and applying the resistive torque equal to the sum of the first torque and of a second torque (Continued)

proportional to the second damping value when the speed of movement is higher than the second speed threshold.

10 Claims, 7 Drawing Sheets

[Fig 1]
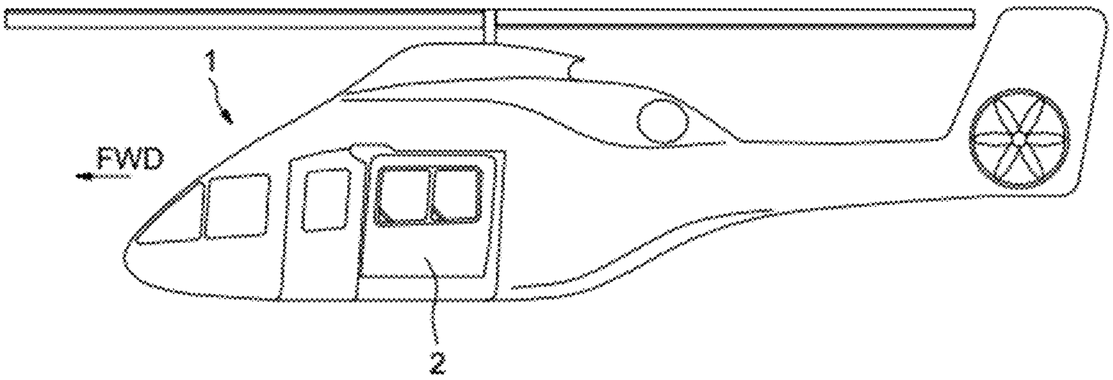
[Fig 2]
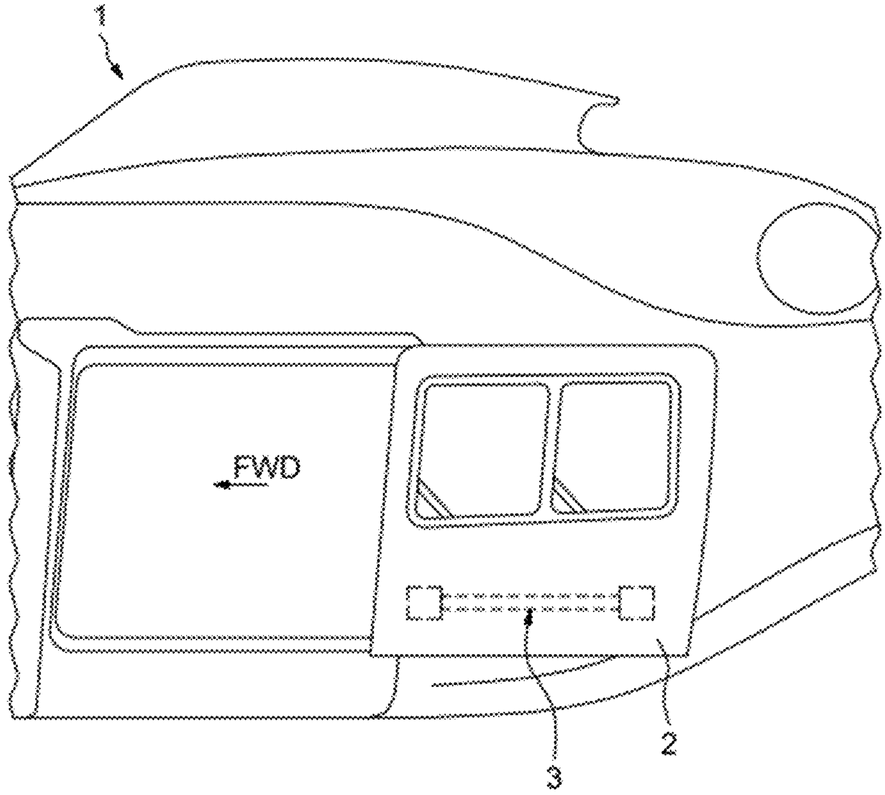

[Fig 3]
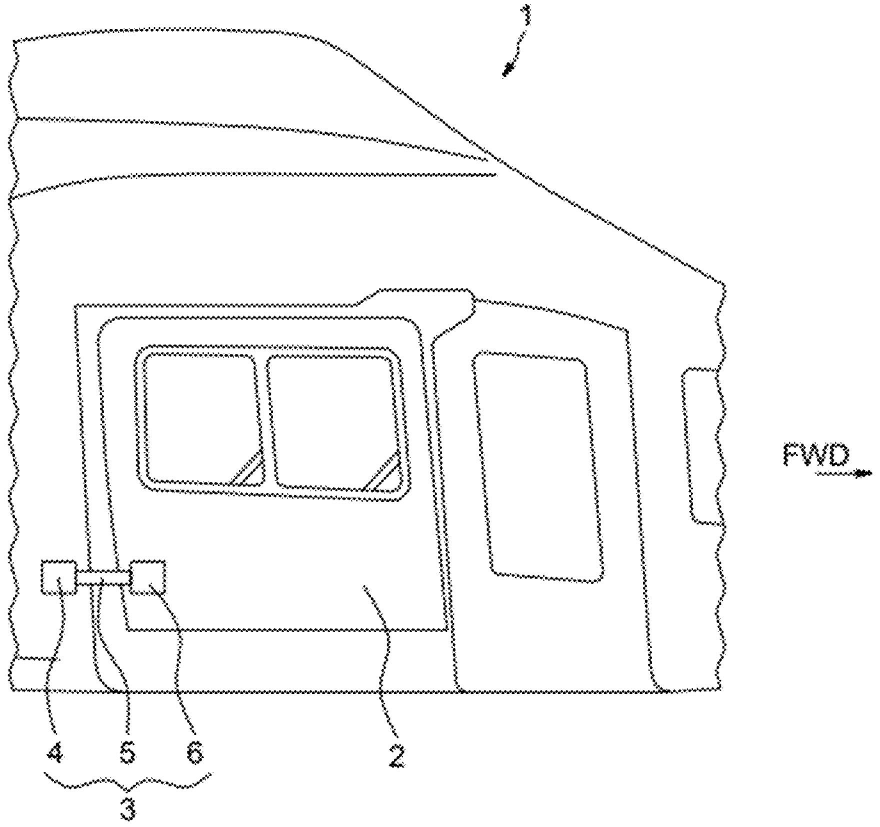

[Fig 4]
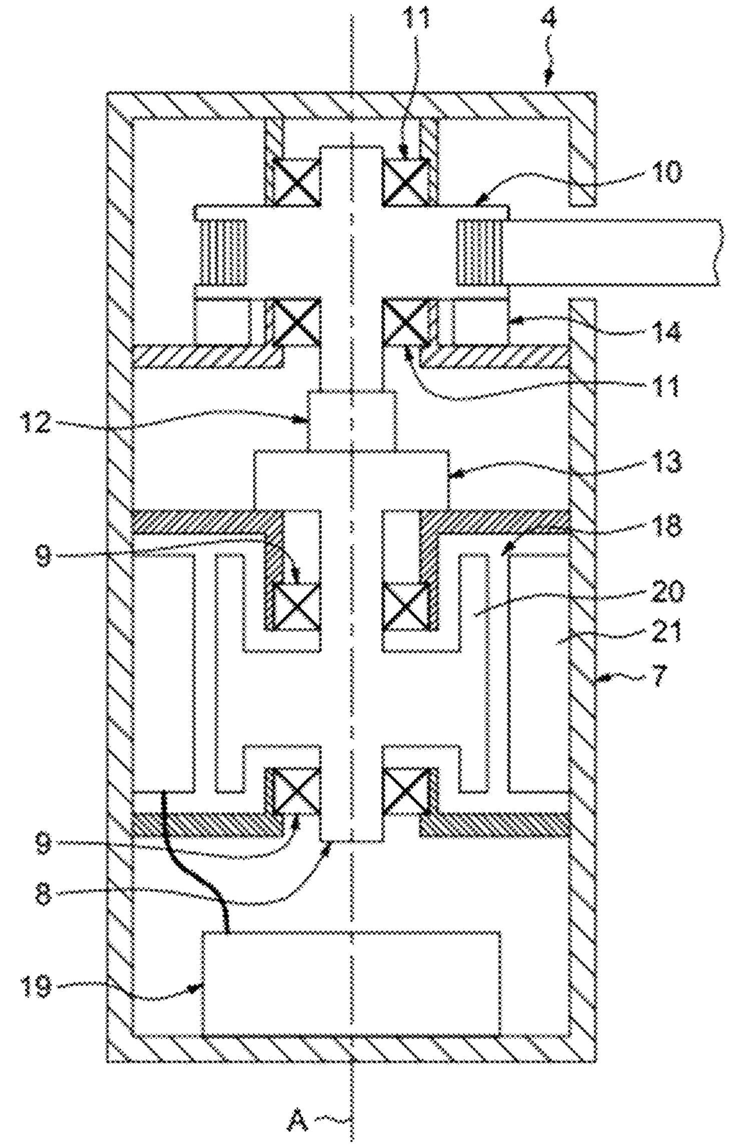

[Fig 5]
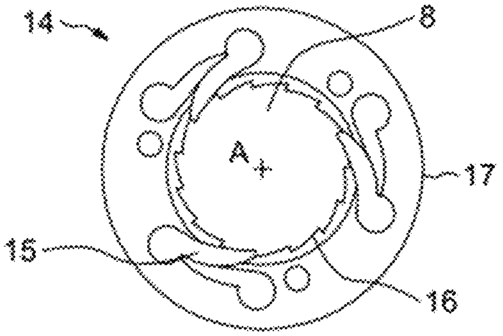
[Fig 6]
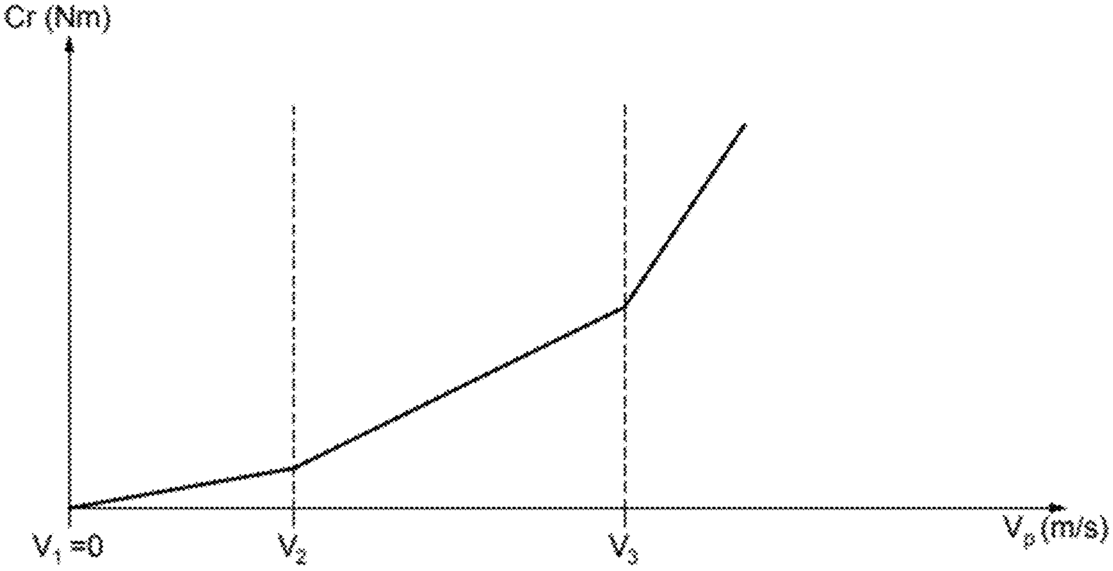

[Fig 7]
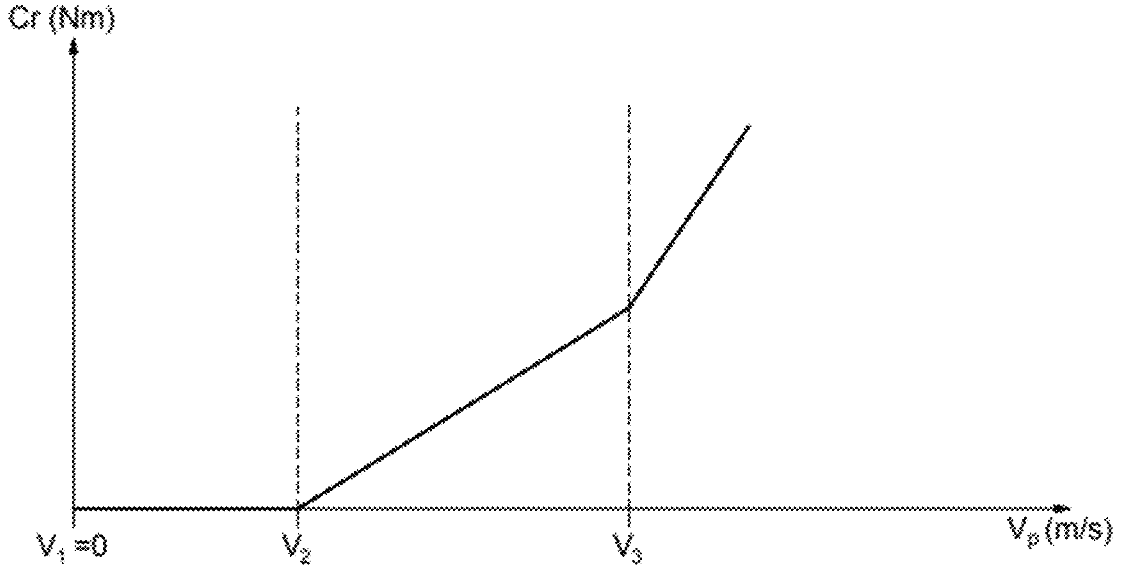
[Fig 8]
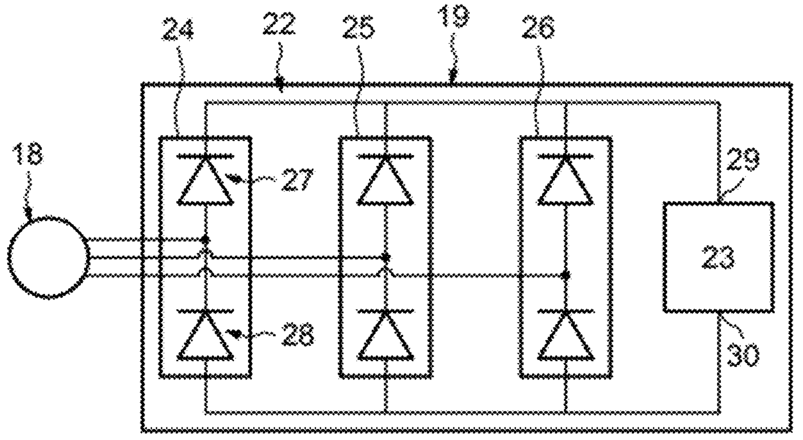

[Fig 9]
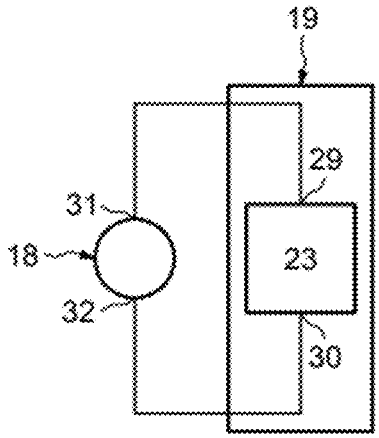
[Fig 10]
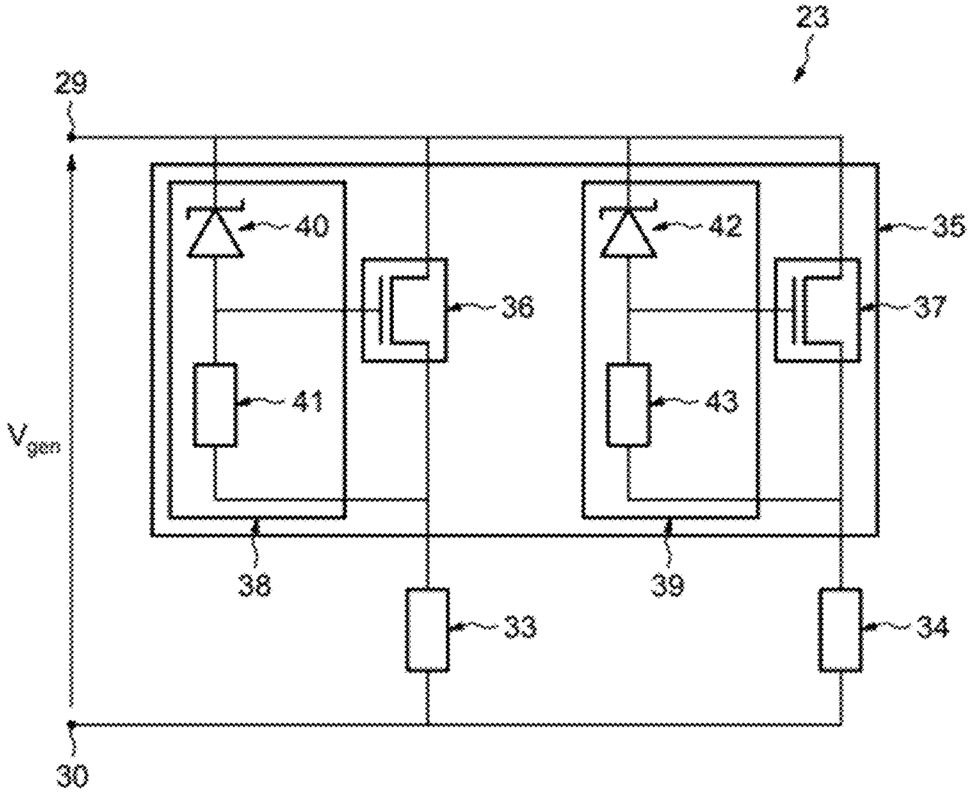

[Fig 11]
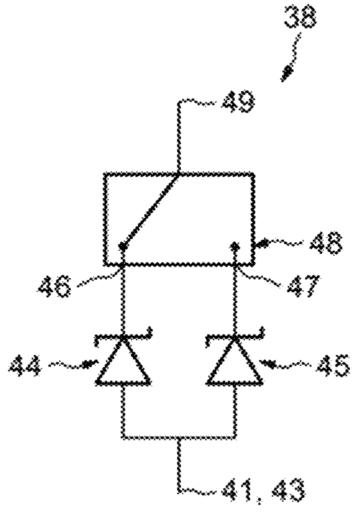
[Fig 12]
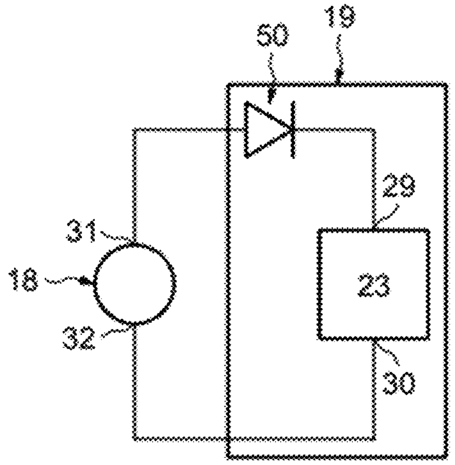

SYSTEM FOR CONTROLLING THE SPEED OF MOVEMENT OF A SLIDING DOOR AND ASSOCIATED AIRCRAFT

TECHNICAL FIELD OF THE INVENTION

The invention relates to systems for opening aircraft sliding doors, and more particularly systems for controlling the speed of movement of aircraft sliding doors and aircrafts equipped with at least one such system.

PRIOR ART

In general, an aircraft comprises a lateral sliding door intended to open during flight, for example during parachuting or during heli-hoisting, in the case where the aircraft is a helicopter.

During opening thereof, the sliding door is subjected to aerodynamic forces that could generate high speeds of opening of the door.

The aerodynamic forces applied on the sliding door are proportional to the square of the flight speed of the aircraft.

In general, a helicopter is equipped with end-of-travel damping cylinders allowing damping the shock generated by the sliding door reaching its stop, thereby preserving the structure of the helicopter.

However, such cylinders do not allow controlling the speed of the sliding door during travel thereof, in particular at high flight speeds of the helicopter.

The document FR3072707 discloses a winder for slowing the closure of a sliding door including a drum and a rewinding means connected to the drum.

The winder further includes a strap connected to the sliding door and a centrifugal brake including mechanical components.

The centrifugal brake includes weights radially movable on the drum by springs and rubbing on a metal surface.

The braking torque generated by the winder follows a law proportional to the square of the speed so that it is not possible to implement a variable law in order to modulate damping according to the speed of the door.

Furthermore, the speed of the sliding door is also slowed down for low speeds.

In addition, the implementation of mechanical components rubbing on one another leads to wear of said components.

The mechanical components are also sensitive to environmental variables, for example temperature, humidity, vibrations, so that the value of the braking torque fluctuates according to the wear condition of the components and to the environmental variables.

Reference could also be made to the document EP3747760, which discloses a control device for controlling the speed of opening of a sliding door when the door has reached a predetermined opening speed of the door.

The device comprises a winding shaft connected to a belt and an eddy current electromagnetic brake for reducing the rotational speed of the winding shaft.

The eddy current electromagnetic brake comprises a stator and a rotor which describes a rotational movement about its axis.

The stator comprises a copper ring and a stack of magnetic laminations, and the rotor comprises a magnetic hub including permanent magnets arranged so that a north pole follows a south pole. The copper ring is subjected to a variable magnetic field generated by the permanent magnets whose frequency is proportional to the rotational speed of the rotor.

The magnetic field is looped back via the stack of laminations of the stator. This phenomenon induces the apparition of eddy currents in the copper ring which generate a stator magnetic field.

The stator magnetic field opposes the rotor magnetic field generated by the permanent magnets and creates an electromagnetic torque. The torque is proportional to the frequency of the variable magnetic field and therefore to the rotational speed of the rotor. The magnetic damping generated by the electromagnetic brake and defined by the ratio of the electromagnetic torque to the rotational speed does not vary according to the rotational speed of the rotor.

According to another embodiment, the eddy current electromagnetic brake comprises a winding replacing the copper ring allowing varying the damping coefficient.

However, the use of an electromagnet requires powering the control device by an electrical power source external to the device which complicates the installation of the device in the aircraft.

The invention aims to overcome all or part of these drawbacks.

DISCLOSURE OF THE INVENTION

In view of the foregoing, an object of the invention is a system for controlling the speed of movement of a sliding door for an aircraft comprising an electromagnetic device for braking the door including a shaft and electromagnetic resistive means, and connecting means intended to be connected to the sliding door and cooperating with the transmission shaft so that when the sliding door moves in a predetermined direction, the connecting means drive the transmission shaft and the electromagnetic resistive means apply a resistive torque on the transmission shaft to control the speed of movement of the door.

The resistive means are autonomous and include a control law relating a first damping value to a first speed threshold of the speed of movement of the door, a second damping value to a second speed threshold of the speed of movement of the door higher than the first speed threshold, the resistive means applying on the transmission shaft the resistive torque equal to a first torque equal to the first damping value multiplied by the difference between the speed of movement of the door and the first threshold when the speed of movement is higher than the first speed threshold, and apply the resistive torque equal to the sum of the first torque and a second torque equal to the second damping value multiplied by the difference between the speed of movement of the door and the second speed threshold when the speed of movement is higher than the second speed threshold.

The variable control law defined by the different resistive torque values depending on the speed of movement of the door allows optimizing the speed of movement of the sliding door according to ranges of speed of movement of the door.

The resistive means are not powered by an external energy source so that they are autonomous and easy to implement in the aircraft because they do not need to be electrically connected to components of the aircraft.

Preferably, the resistive means comprise a generator connected to the transmission shaft and configured to apply the resistive torque, and means for controlling the generator powered by the generator and including the control law.

Since the resistive means are made by electromechanical components (generator), they are not sensitive to environmental variables, for example temperature, humidity, vibrations, so that the value of the resistive torque fluctuates according to the environmental variables Advantageously, the control means comprise dissipation means comprising a first electrical resistive means, a second electrical resistive means, and switching means configured to connect the first resistive means to the terminals of the generator when the electrical voltage produced by the generator is equal to a predetermined first voltage threshold indicative of the first speed value and also to connect the second resistive means to the terminals of the generator when the electrical voltage produced by the generator is equal to a predetermined second voltage threshold indicative of the second speed value, the first resistive means being configured so that, when it is connected to the generator, the generator applies the resistive torque equal to the first torque value on the transmission shaft, and the second resistive means being configured so that, when it is connected to the generator, the generator applies the resistive torque equal to the sum of the first torque value and the second torque value on the transmission shaft.

Advantageously, the switching means comprise a first switch and first control means configured to close the first switch when the voltage at the terminals of the first switch is higher than or equal to the predetermined first voltage threshold so as to connect the first resistive means to the terminals of the generator, and a second switch and second control means configured to close the second switch when the voltage at the terminals of the second switch is higher than or equal to the predetermined second voltage threshold so as to connect the second resistive means to the terminals of the generator when the voltage at the terminals of the second switch is higher than or equal to the predetermined second voltage threshold.

Advantageously, the first control means or the second control means are further configured to close the switch associated with said means when the voltage at the terminals of said switch is higher than or equal to a predetermined third voltage threshold, said control means including a selection switch configured to control said switch according to the predetermined voltage threshold associated with said first or second means or according to the third voltage threshold.

Preferably, the generator comprises a brushless rotating electric machine or a brushed rotating electric machine, the braking device further comprises a clutch device connecting the connecting means to the transmission shaft so that the clutch device is engaged when the door moves in the predetermined direction and is disengaged when the door moves in another direction.

Advantageously, if the generator comprises a brushless rotating electric machine, the control means further comprise a passive voltage rectifier connecting the brushless rotating electric machine to the switching means.

Preferably, if the generator comprises a brushed rotating electric machine, the control means further comprise a diode connecting a terminal of said machine to the switching means so that the rotating electric machine powers the control means when the door moves in the predetermined direction.

Advantageously, the connecting means comprise a strap, the braking device further comprising a return spring configured to wind the strap around the transmission shaft when the clutch device is disengaged.

An aircraft is also provided including a sliding door and a system as defined before connected to the sliding door.

BRIEF DESCRIPTION OF THE DRAWINGS

Other aims, features and advantages of the invention will become apparent upon reading the following description, given just as a non-limiting example, and made with reference to the appended drawings, wherein:

FIG. 1 schematically illustrates an aircraft including a sliding door according to the invention;

FIG. 2 schematically illustrates a partial view of the aircraft including a system for controlling the speed of opening of the sliding door according to the invention:

FIG. 3 schematically illustrates a partial view of the interior of the cabin of the aircraft according to the invention;

FIG. 4 schematically illustrates an example of a system for controlling the speed of opening of the sliding door according to the invention:

FIG. 5 schematically illustrates an embodiment of a clutch device according to the invention, FIG. 6 schematically illustrates a first example of a control law according to the invention, FIG. 7 schematically illustrates a second example of a control law according to the invention, FIG. 8 schematically illustrates a first embodiment of the resistive means according to the invention, FIG. 9 schematically illustrates a second embodiment of the resistive means according to the invention, FIG. 10 schematically illustrates a first embodiment of the dissipation means according to the invention, FIG. 11 schematically illustrates an embodiment of comparison means, and FIG. 12 schematically illustrates a third embodiment of the resistive means according to the invention.

DETAILED DISCLOSURE OF AT LEAST ONE EMBODIMENT

Reference is made to FIG. 1 which schematically illustrates an aircraft 1 including a sliding door 2, shown in the closed position, and intended to open in flight, and a system 3 for controlling the speed of movement of the sliding door 2 (not shown).

The direction of normal movement of the aircraft is represented by an arrow FWD directed forward. In turn, the door opens rearwards and is therefore subjected to the aerodynamic forces generated during the movement of the aircraft 1.

It is assumed that the system 3 controls the speed of opening of the sliding door 2.

Alternatively, the system 3 controls the speed of closure of the sliding door 3.

The aircraft 1 as shown is a helicopter.

Of course, the aircraft 1 may be any type of aircraft including a sliding door intended to be opened in flight, for example an airplane including a sliding door.

FIG. 2 illustrates a partial view of the aircraft 1, from the outside, the sliding door 2 being open.

The system 3 for controlling the speed of movement of the sliding door 2 (shown in dotted lines) is placed in the cabin of the aircraft 1.

FIG. 3 illustrates a partial view of the interior of the cabin of the aircraft 1, the sliding door 2 being closed.

The control system 3 comprises an electromagnetic braking device 4 for limiting the speed of movement of the sliding door 2 and mounted on the structure of the cabin of the aircraft 1, and connecting means including a strap 5 wound in the device 4 and attached to a fastening point 6 of the sliding door 2.

The braking device 4 herein limits the speed of opening of the sliding door 2.

Alternatively, the braking device 4 may be mounted on the sliding door 2, and the strap 5 is fastened to a fastening point of the structure of the cabin of the aircraft 1.

The system 3 may be mounted indifferently on either side of the aircraft 1 with respect to a longitudinal axis of symmetry of the aircraft 1, depending on the position of the door.

When the sliding door 2 opens, the strap 5 deploys by unwinding and extends under the effect of the translation of the sliding door 2.

According to another embodiment, the connecting means comprise a rack fastened on the sliding door 2 and the device 4 comprises a pinion cooperating with the rack.

According to still another embodiment, the connecting means comprise a belt connected on the one hand to the device 4 and, on the other hand, to a pulley secured to the sliding door 2.

FIG. 4 illustrates an embodiment of the system 3.

The braking device 4 and the strap 5 are found again.

The braking device 4 comprises a casing 7 comprising a transmission shaft 8 with a central axis rotatably held in the casing 7 by bearings 9, for example ball bearings. Of course, the bearings 9 may be of another type, for example needle bearings or plain bearings.

The braking device 4 further comprises a pulley 10 supporting the strap 5 and rotatably held in the casing 7 by bearings 11.

The pulley 10 is connected to an end of the transmission shaft 8 via a clutch device 12 and a reduction gear 13 secured to the transmission shaft 8.

The clutch device 12 is engaged upon unwinding of the strap 5 so that the strap 5 drives the transmission shaft 8, and disengaged upon winding of the strap 5 when the sliding door 2 is closed.

For example, the clutch device 12 comprises a freewheel 14 as shown in FIG. 5.

For example, the freewheel 12 comprises pawls 15 cooperating with notches 16 so that, upon unwinding of the strap 5, the pawls 15 are engaged in the notches 16, and so that upon winding of the strap 5 around the shaft 8 (closure of the door 2), the pawls 15 are no longer engaged in the notches 16.

The pawls 15 are arranged on a shaft 17 secured to an input shaft of the reduction gear 13.

Alternatively, the clutch device 12 comprises a freewheel with rolls.

For example, the reduction gear 13 comprises an epicyclic reduction gear and allows increasing the rotational speed of the transmission shaft 8.

The device 4 further comprises a return spring 14 driving the pulley 10 to wind the strap 5 around the transmission shaft 8 when the clutch device 12 is disengaged.

The strap 5 clears away upon closure of the sliding door 2.

The braking device 4 comprises electromagnetic resistive means applying a resistive torque Cr on the transmission shaft 8 to control the speed of movement of the sliding door 2.

The resistive means are autonomous and include a control law relating a first damping value A1 to a first speed threshold V1 of the speed of movement Vp of the door 2, a second damping value A2 to a second speed threshold V2 of the speed of movement Vp of the door 2, and a third damping value A3 to a third speed threshold V3 of the speed of movement Vp of the door 2.

The second threshold V2 is higher than the first threshold V1 and lower than the third threshold V3.

The resistive means apply on the transmission shaft 8 the resistive torque Cr equal to a first torque C1 equal to the first damping value A1 multiplied by the difference between the speed of movement Vp of the door 2 and the first speed threshold V1 when the speed of movement Vp is higher than the first speed threshold V1.

$$Cr = C1 = A1 \cdot (Vp - V1),\ Vp > V1 \tag{1}$$

The resistive means apply on the transmission shaft 8 the resistive torque Cr equal to the sum of the first torque C1 and a second torque C2 equal to the second damping value A2 multiplied by the difference between the speed of movement Vp of the door 2 and the second speed threshold V2 when the speed of movement Vp is higher than the second speed threshold V2.

$$Cr = C1 + C2 = A1 \cdot (Vp - V1) + A2 \cdot (Vp - V2),\ Vp > V2 \tag{2}$$

The resistive means apply on the transmission shaft 8 the resistive torque Cr equal to the sum of the first torque C1, the second torque C2 and a third torque C3 equal to the third damping value A3 multiplied by the difference between the speed of movement Vp of the door 2 and the third speed threshold V3 when the speed of movement Vp is higher than the third speed threshold V3.

$$Cr = C1 + C2 + C3 = A1 \cdot (Vp - V1) + A2 \cdot (Vp - V2) + A3 \cdot (Vp - V3),\ Vp > V3 \tag{3}$$

The values of the speed thresholds V1, V2, V3, the first damping value A1, the second damping value A2 and the third damping value A3 are predetermined, for example based on tests carried out on the aircraft 1.

For example, it is assumed that the second damping value A2 is higher than the first damping value A1 and lower than the third damping value A3.

Of course, the damping values A1, A2, A3 may be classified differently.

FIG. 6 illustrates a first example of the control law showing the evolution of the resistive torque Cr applied on the transmission shaft 8 according to the value of the speed of movement Vp.

For example, it is assumed that the first speed threshold V1 is zero so that the device 4 slows down the movement of the sliding door 2 as soon as the door 2 starts moving.

The device 4 allows slowing down the movement of the sliding door 2 down to the first speed threshold V1, to further slow down the speed of movement of the sliding door 2 when it exceeds the second speed threshold V2 and even more when it exceeds the third speed threshold V3, so that the sliding door 2 does not exceed an acceptable maximum speed by end-of-travel damping cylinders of the aircraft 1.

The first damping value A1 may be zero so as not to affect the operation of the sliding door 2 for speeds of movements Vp lower than the first threshold V1.

FIG. 7 illustrates a second example of the control law showing the evolution of the resistive torque Cr applied on the transmission shaft according to the value of the speed of movement Vp when the first damping value A1 is zero and the first threshold V1 is zero.

The device 4 allows slowing down the movement of the sliding door 2 when it exceeds the second speed threshold V2 and even more when it exceeds the third speed threshold V3.

The variable control law defined by different resistive torque values Cr depending on the speed of movement of the door 2 allows optimizing the speed of movement of the sliding door 2 according to ranges of speed of movement of the door 2, unlike a linear torque-speed evolution.

For example, the control law allows optimizing the speed Vp of the sliding door 2 at low speed (lower than the second speed threshold V2, the first threshold V1 being zero) by defining a zero resistive torque Cr (corresponding to a zero first damping value A1), a resistive torque CR whose value is defined by the equation (1) when the speed of movement VP of the sliding door 2 is within an intermediate speed range (between the second speed threshold V2 and the third speed threshold V3) whose value is defined by the equation (2), and possibly optimizing the speed of movement Vp of the sliding door 2 at high speed (higher than the third speed threshold V3) by defining a resistive torque Cr according to the equation (3).

Like in this example, the first damping value A1 is zero, the device 4 does not slow down the speed of movement Vp of the door 2 so that if frictions exerted on the door 2 increase so as to slow down the speed of movement Vp of the door 2, it is not necessary to disconnect the strap from the door 2 to obtain a satisfactory speed of movement of the door 2.

For example, the second speed threshold V2 is comprised between 0.5 and 0.7 m/s when the first speed threshold V1 is zero.

It is assumed hereafter that the first threshold V1 is zero and that the first damping value A1 is zero.

Alternatively, the control law may define more than three pairs associating a damping value with a speed threshold.

Referring to FIG. 4, the resistive means comprise a generator 18 connected to the transmission shaft 8 to apply the resistive torque Cr on said shaft, and control means 19 of the generator 18 powered by the generator and including the control law.

The control means 19 are made from semiconductors as detailed hereafter and are fastened on the casing 7.

The generator 18 comprises a brushless rotating electric machine or a brushed rotating electric machine, operating in eddy current damping, and includes a rotor 20 secured to the transmission shaft 8 and a stator 21 secured to the casing 7.

The stator 21 comprises a magnetic circuit including a stack of magnetic laminations, and the rotor 20 comprises permanent magnets arranged so that a north pole follows a south pole.

The stack of laminations is subjected to a variable magnetic field generated by the permanent magnets, whose frequency is proportional to the rotational speed of the rotor.

The magnetic field is looped back by means of the laminations of the stator inducing the apparition of eddy currents in the magnetic circuit which generates a stator magnetic field.

The stator magnetic field opposes the rotor magnetic field generated by the permanent magnets and creates an electromagnetic torque equal to the resistive torque Cr.

The resistive torque Cr is proportional to the frequency of the variable magnetic field and therefore to the rotational speed of the rotor.

FIG. 8 schematically illustrates a first embodiment of the resistive means.

The generator 18 comprises a brushless rotating electric machine, for example a three-phase synchronous one.

The control means 19 comprise a voltage rectifier 22 connected to the brushless rotating electric machine to rectify the voltage generated by said machine when it is driven by the transmission shaft 8, and dissipation means 23.

The rectifier 22 is of the passive type and comprises for example a diode bridge including three identical branches 24, 25, 26.

Each branch 24, 25, 26 comprises two diodes 27, 28.

The cathode of a first diode 27 is connected to a first terminal 29 of the dissipation means 23, the anode of the first diode 27 is connected to the cathode of the second diode 28.

The anode of the second diode 28 is connected to a second terminal 30 of the dissipation means 23.

The anode of the first diode 27 is also connected to a phase of the three-phase rotating electric machine so that each branch 23, 24, 25 is connected to a different phase of said machine.

Alternatively, the rotating electric machine may comprise more than at least three phases, each phase being connected to a different branch of the passive rectifier 22.

FIG. 9 schematically illustrates a second embodiment of the resistive means.

The generator 18 comprises a brushed electric machine.

The control means 19 comprise the dissipation means 23.

A positive terminal 31 of the brushed electric machine is connected to the first terminal 29 of the dissipation means 23 and a negative terminal 32 of the brushed electric machine is connected to the second terminal 30 of the dissipation means 23.

FIG. 10 schematically illustrates a first embodiment of the dissipation means 23.

The dissipation means 23 comprise a first electrical resistive means and a second electrical resistive means formed by the coils of the generator 18, and for example by a first resistor 33 and a second resistor 34.

The dissipation means 23 further comprise switching means 35.

The switching means 35 connect the first resistive means to the terminals of the generator 18 when the electrical voltage Vgen produced by the generator 18 is equal to a predetermined first voltage threshold S1 indicative of the second speed value V2.

The switching means 35 further connect the second resistive means to the terminals of the generator 18 when the electrical voltage Vgen produced by the generator is equal to a predetermined second voltage threshold S2 indicative of the third speed value V3.

The relationship between the voltage produced by the generator 18 and the speed of movement of the sliding door 2 is determined based on the characteristics of the reduction gear 13, of the generator 18, and of the connecting means.

The first resistive means is sized so that, when it is connected to the generator 18, the generator 18 applies the resistive torque Cr as defined by the equation (2) on the transmission shaft 8.

The second resistive means is sized so that when it is connected to the generator, the generator applies the resistive torque Cr as defined by the equation (3) on the transmission shaft 8.

Sizing of the first resistive means and the second resistive means takes account of the resistance of the coils of the generator 18.

For example, the switching means 35 comprise a first switch 36, a second switch 37, first control means 38 of the first switch 36, and second control means 39 of the second switch 37.

For example, each of the first switch 36 and the second switch 37 comprises a field-effect transistor or a transistor of another type.

Alternatively, each of the first switch 36 and the second switch 37 comprises a set of transistors for example connected according to a Darlington scheme if the electrical power passing through a transistor is likely to deteriorate or destroy said transistor.

The drains of the transistors of the first switch 36 and of the second switch 37 are connected to the first terminal 29.

The source of the transistor of the first switch 36 is connected to a first end of the resistor 33 of the first resistive element, and the gate of said transistor is connected to the first control means 38.

The source of the transistor of the second switch 37 is connected to a first end of the resistor 34 of the second resistive element, and the gate of said transistor is connected to the second control means 39.

The second end of the first and second control resistors 40, 41 is connected to the second terminal 30.

When the voltage Vgen produced by the generator 18 is equal to or higher than the first threshold S1, the transistor of the first switch 36 is conducting and connects the resistor 33 to the first and second terminals 29, 30.

When the voltage Vgen produced by the generator 18 is equal to or higher than the second threshold S2, the transistor of the second switch 37 is conducting and connects the resistor 34 to the first and second terminals 29, 30.

As soon as the voltage Vgen produced by the generator 18 is lower than the second threshold S2, the transistor of the second switch 37 is open so that the resistor 34 is no longer connected to the first and second terminals 29, 30.

As soon as the voltage Vgen produced by the generator 18 is lower than the first threshold S1, the transistor of the first switch 36 is open so that the resistor 33 is no longer connected to the first and second terminals 29, 30.

The first control means 38 close the first switch 36 when the voltage at the terminals of the first switch 36 is higher than or equal to the first voltage threshold S1.

The second control means 39 close the second switch 37 when the voltage at the terminals of the first switch 37 is higher than or equal to the second voltage threshold S2.

The first control means 38 comprise voltage comparison means comprising for example a first Zener diode 40 having a voltage threshold equal to the first voltage threshold S1 and a first control resistor 41, and the second control means 39 comprise voltage comparison means comprising for example a second Zener diode 42 having a voltage threshold equal to the second voltage threshold S2 and a second control resistor 43.

The cathode of the first and second Zener diodes 40, 42 is connected to the first terminal 29.

The anode of the first Zener diode 40 is connected to the gate of the transistor of the first switch 36 and to a first end of the first control resistor 41.

The second end of the first control resistor 41 is connected to the source of the transistor of the first switch 36.

The anode of the second Zener diode 42 is connected to the gate of the transistor of the second switch 37 and to a first end of the second control resistor 43.

The second end of the second control resistor 43 is connected to the source of the transistor of the second switch 37.

The Zener diodes 38, 39 compare the voltage Vgen produced by the generator 18 with the voltage thresholds S1, S2.

Alternatively, the first and second electrical resistive means are formed by the coils of the generator 18 and one amongst the first and second resistors.

According to still another variant, the first and second electrical resistive means are formed by the coils of the generator 18, the dissipation means 23 including no first and second resistors (generator 18 in short-circuit), the control law being a simple linear law including a triggering threshold equal to the value of the first threshold V1 if the first threshold V1 has a non-zero value, and including no triggering threshold in the opposite case.

Alternatively, a resistor is connected between the terminals 29, 30 to create a permanent resistive torque applied on the transmission shaft 8 as soon as the door 2 is opened.

For high powers or thresholds S1, S2 that are not equal to the voltage thresholds of the Zener diodes, each Zener diode 40, 42 and the associated control resistor 41, 43 may be replaced by a circuit configured to connect the first resistive means to the terminals of the generator, and to connect the second resistive means to the terminals of the generator when the values of the voltage thresholds S1, S2 are reached.

FIG. 11 schematically illustrates a second embodiment of the control means 38, 39.

Since the architecture of the control means 38, 39 is identical, only the architecture of the first control means 38 is detailed.

The comparison means of the first control means 38 comprise a third Zener diode 44 having a voltage threshold equal to the first threshold S1 and a fourth Zener diode 45 having a third voltage threshold equal to a third voltage threshold different from the first threshold S1.

The anode of each diode 44, 45 is connected to one of the control resistors 41, 43 and the cathode of each of the diodes is connected to a different input 46, 47 of a selection switch 48.

An output 49 of the switch 48 is connected to the first terminal 29.

The switch 48 allows connecting either one of the two diodes 44, 45 in order to easily modify the voltage threshold of the comparison means by connecting either one of the diodes 44, 45 between the first terminal 29 and the control resistor 41, 43.

The selection switch 48 allows controlling the first switch 36 according to the first voltage threshold S1 or according to the third voltage threshold S3.

For example, the comparison means allow easily testing different voltage thresholds when adjusting the control system 3 mounted in the aircraft 1 and connected to the sliding door 2.

The switch 48 may be controlled manually or by a controller.

Alternatively, the comparison means may comprise more than two Zener diodes having different voltage thresholds connected in parallel, the switch 48 comprising as many inputs as Zener diodes.

According to still another variant, the dissipation means 23 may comprise a combination of the first and second embodiments of the means for comparing the voltage Vgen illustrated in FIGS. 10 and 11.

For example, the dissipation means 23 may comprise the two diodes 44, 45 in parallel connected to the switch 48 as described in the second embodiment illustrated in FIG. 11 to control the first switch 36, and the diode 42 to control the second switch 37.

The clutch device 12 uncouples the generator 18 from the pulley 10 so that it does not generate a voltage upon closure of the sliding door 2 likely to make the switching means switch to apply the resistive torque Cr on the transmission shaft 8.

FIG. 12 schematically illustrates a third embodiment of the resistive means operating with or without the freewheel 12.

The generator 18 comprises the brushed electric machine.

Since the current generated by the brushed rotating electric machine depends on the direction of rotation of the transmission shaft 8, the control means 19 comprise the dissipation means 23 and a diode 50 connected to a terminal of said machine and to the switching means so that the brushed rotating electric machine powers the control means 19 when the sliding door 2 moves in the predetermined direction, herein the direction of opening of the sliding door 2.

The positive terminal 31 of the brushed electric machine is connected to the anode of the diode 50, the cathode of the diode 50 is connected to the first terminal 29 of the dissipation means 23, and the negative terminal 32 of the brushed electric machine is connected to the second terminal 30 of the dissipation means 23.

When the transmission shaft 8 drives the brushed rotating electric machine in the direction of opening of the sliding door 2, said machine outputs a current on the positive terminal 31 so that the diode 48 is conducting and powers the dissipation means 23.

When the transmission shaft 8 drives the brushed rotating electric machine in the direction of closure of the sliding door 2, said machine outputs a current on the negative terminal 32 so that the diode 48 is not conducting and does not power the dissipation means 23.

The resistive means are not powered by an external energy source so that they are autonomous and easy to implement in the aircraft 1 because they do not need to be electrically connected to components of the aircraft 1.

Furthermore, in the case where the generator 18 comprises a brushless rotating machine, no part rubs on another so that the resistive means cannot wear, the braking device 4 requiring no maintenance operation.

Since the resistive means are made by electromechanical components, they are not sensitive to environmental variables, for example temperature, humidity, vibrations, so that the value of the resistive torque Cr does not fluctuate according to environmental variables.

The invention claimed is:

1. A system for controlling the speed of movement of a sliding door for an aircraft comprising an electromagnetic device for braking the door including a shaft and electromagnetic resistive means, and connecting means intended to be connected to the sliding door and cooperating with the transmission shaft so that when the sliding door moves in a predetermined direction, the connecting means drive the transmission shaft and the electromagnetic resistive means apply a resistive torque (Cr) on the transmission shaft to control the speed of movement of the door, wherein the resistive means are not powered by an external energy source and include a control law relating a first damping value to a first speed threshold (V1) of the speed of movement of the door, a second damping value to a second speed threshold (V2) of the speed of movement of the door higher than the first speed threshold (V1), the resistive means applying on the transmission shaft the resistive torque (Cr) equal to a first torque equal to the first damping value multiplied by the difference between the speed of movement of the door and the first threshold (V1) when the speed of movement of the door is higher than the first speed threshold (V1), and apply the resistive torque equal to the sum of the first torque and a second torque equal to the second damping value multiplied by the difference between the speed of movement of the door and the second speed threshold (V2) when the speed of movement of the door is higher than the second speed threshold (V2).

2. The system according to claim 1, wherein the resistive means comprise a generator connected to the transmission shaft and configured to apply the resistive torque (Cr), and means for controlling the generator powered by the generator and including the control law.

3. The system according to claim 2, wherein the control means comprise dissipation means comprising a first electrical resistive means, a second electrical resistive means, and switching means configured to connect the first resistive means to the terminals of the generator when the electrical voltage produced by the generator is equal to a predetermined first voltage threshold indicative of the first speed value (V1) and also to connect the second resistive means to the terminals of the generator when the electrical voltage produced by the generator is equal to a predetermined second voltage threshold indicative of the second speed value (V2), the first resistive means being configured so that, when it is connected to the generator, the generator applies the resistive torque (Cr) equal to the first torque on the transmission shaft, and the second resistive means being configured so that, when it is connected to the generator, the generator applies the resistive torque (Cr) on the transmission shaft equal to the sum of the first torque and the second torque.

4. The system according to claim 3, wherein the switching means comprise a first switch and first control means configured to close the first switch when the voltage at the terminals of the first switch is higher than or equal to the predetermined first voltage threshold so as to connect the first resistive means to the terminals of the generator, and a second switch and second control means configured to close the second switch when the voltage at the terminals of the second switch is higher than or equal to the predetermined second voltage threshold so as to connect the second resistive means to the terminals of the generator when the voltage at the terminals of the second switch is higher than or equal to the predetermined second voltage threshold.

5. The system according to claim 4, wherein at least the first control means or the second control means are further configured to close the switch associated with said control means when the voltage at the terminals of said switch is higher than or equal to a predetermined third voltage threshold, said control means including a selection switch configured to control the switch associated with said control means according to the predetermined voltage threshold associated with the first control means or the second control means or according to the third voltage threshold.

6. The system according to claim 2, wherein the generator comprises a brushless rotating electric machine or a brushed rotating electric machine, the braking device further comprises a clutch device connecting the connecting means to the transmission shaft so that the clutch device is engaged when the door moves in the predetermined direction and is disengaged when the door moves in another direction.

7. The system according to claim 6, wherein if the generator comprises a brushless rotating electric machine, the control means further comprise a passive voltage rectifier connecting the brushless rotating electric machine to the switching means.

8. The system according to claim 6, wherein if the generator comprises a brushed rotating electric machine, the control means further comprise a diode connecting a terminal of said machine to the switching means so that the rotating electric machine powers the control means when the door moves in the predetermined direction.

9. The system according to claim 6, wherein the connecting means comprise a strap, the braking device further comprising a return spring configured to wind the strap around the transmission shaft when the clutch device is disengaged.

10. An aircraft comprising a sliding door and a system according to claim 1 connected to the sliding door.

* * * * *